United States Patent [19]

Riedle

[11] Patent Number: 5,151,936
[45] Date of Patent: Sep. 29, 1992

[54] INTERFACE MEANS

[75] Inventor: Ulrich Riedle, Feldkirchen-Westerham, Fed. Rep. of Germany

[73] Assignee: Siemens Aktiengesellschaft, Munich

[21] Appl. No.: 529,613

[22] Filed: May 29, 1990

[30] Foreign Application Priority Data

May 31, 1989 [DE] Fed. Rep. of Germany ....... 3917713

[51] Int. Cl.$^5$ .............................................. H04M 9/00
[52] U.S. Cl. .................................. 379/403; 379/402; 379/399
[58] Field of Search ............... 379/399, 401, 402, 403, 379/229, 231, 232, 233, 236, 237, 238, 239

[56] References Cited

U.S. PATENT DOCUMENTS

| | | | |
|---|---|---|---|
| 4,110,565 | 8/1978 | Gaetano | 379/236 |
| 4,126,765 | 11/1978 | Calder et al. | 379/236 |
| 4,310,725 | 1/1982 | Mehaffey | 379/231 |
| 4,563,547 | 1/1986 | Booth | 379/236 |
| 4,907,261 | 3/1990 | Chapman | 379/236 |
| 4,914,690 | 4/1990 | Hagedorn | 379/233 |
| 4,930,153 | 5/1990 | Hagedorn | 379/233 |

FOREIGN PATENT DOCUMENTS 3624862 1/1988 Fed. Rep. of Germany .
2220054 3/1988 Japan .
2011689 7/1979 United Kingdom .

OTHER PUBLICATIONS

"A Universal Junction Interface for Digital Exchanges", by J. Ames et al Apr. 20, 1982, pp. 22–26.
"System 12 Analog Line Circuit" by J. Danneels et al, Electrical Communication, vol. 59, No. ⅓, Dec. 17, 1984, pp. 43–47.

Primary Examiner—James L. Dwyer
Assistant Examiner—Jhancy Augustus
Attorney, Agent, or Firm—Hill, Van Santen, Steadman & Simpson

[57] ABSTRACT

An interface between a bidirectional transmission channel with analog signals and four-wire input of a digital communication system. In order to enable a formatting of the interface as an integrated module in 10 V technology, a repeater or transformer is operated as an attenuation element in a lower frequency range and the transmission or, respectively, terminating impedance is selected such that all signalization voltages are transformed into a range that can be evaluated in 10 V technology, whereby, for suppressing higher-frequency noise signals, the signalization voltages are supplied via a low-pass filter to a ringing signal detector or, respectively, via a selective band-pass filter to a call charge signal detector.

14 Claims, 2 Drawing Sheets

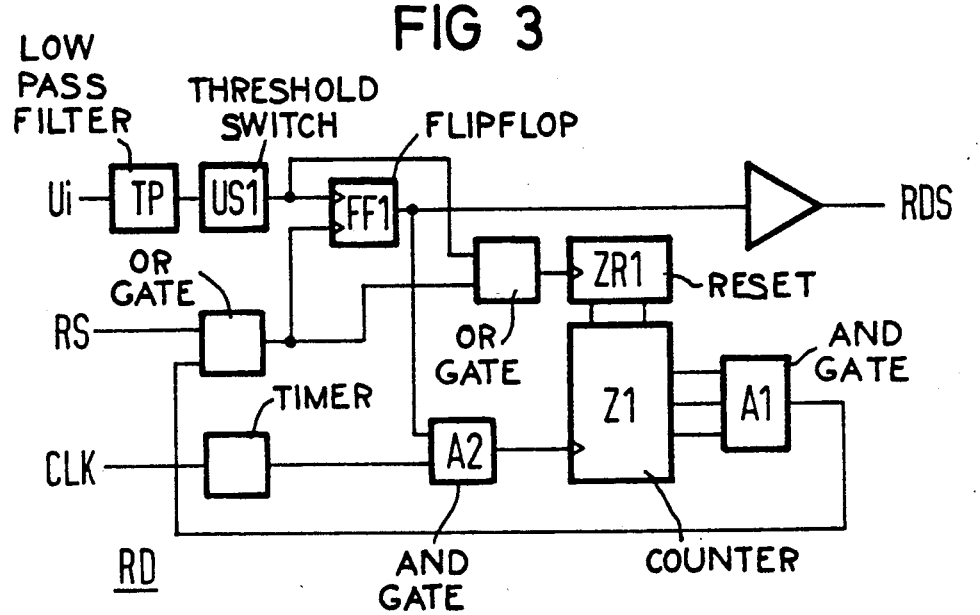
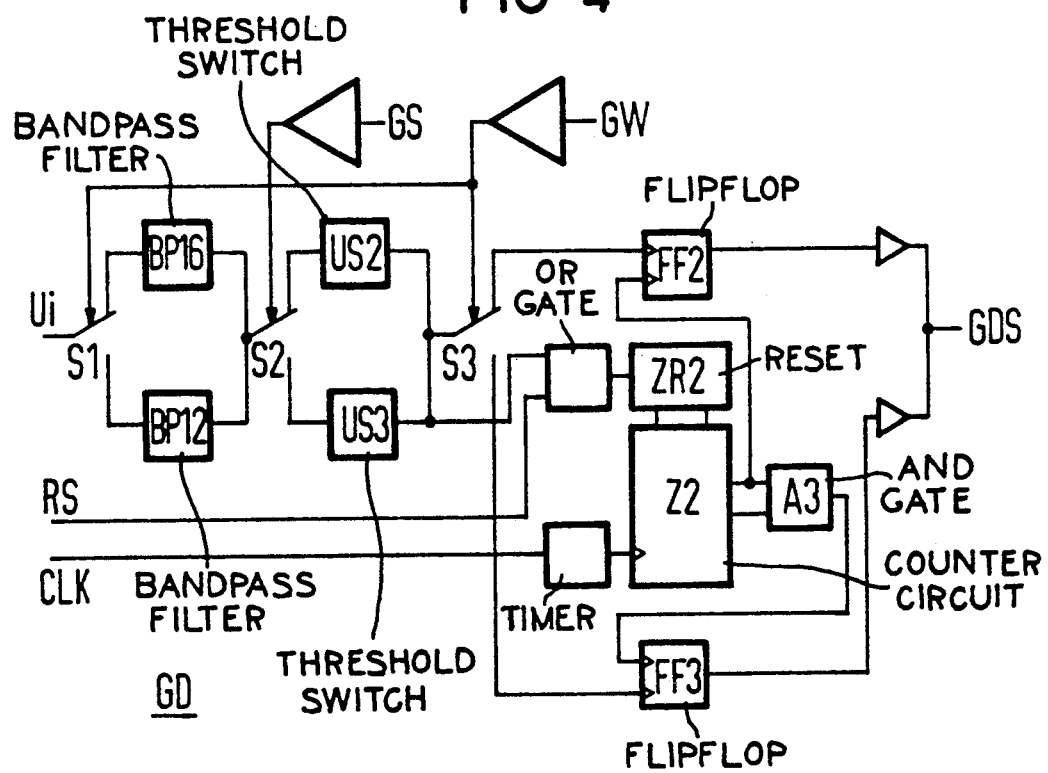

INTERFACE MEANS

BACKGROUND OF THE INVENTION

The present invention is directed to an interface means having amplification and attenuation elements as well as different signalization detectors between a bidirectional transmission channel having analog signals and a signal process-codec filter having a four-wire input for matching the line signalizations to interface messages of a digital communication system.

Such an interface means represents the connecting element between the signal process-codec filter and the transformer of a link between private branch exchanges or, respectively, between private branch exchanges and a public exchange. This interface means must meet a number of functions. For supporting the signal processor-codec filter, such functions are, for example, amplifying or, respectively, attenuating voice signals, and setting up a negative feedback for promoting the formation of an input impedance. In addition, the interface means must be in a position to filter out and to acquire call charge pulses as well as to suppress the call charge pulses in the direction toward the signal processor-codec filter. Further, ringing signals and cleardown messages must be recognized. The full duplex capability of the overall transmission channel cannot be limited and the interface means must be disconnectible in a standby mode. Signalization voltages of a maximum of 12 volts must be capable of being effectively processed for the call charges with a frequency of 12 kHz or, respectively, 16 kHz and 90 V must be capable of being effectively processed for the cleardown voltage in the frequency range <60 Hz and voice signal voltages below 1.1 V must be capable of being effectively processed in the voice-band (0.3 through 3.4 kHz).

SUMMARY OF THE INVENTION

An object of the present invention is to provide an interface means of the type recited above such that it can be operated as an integrated module in, for example, 10 V-CMOS technology.

In order to achieve this object, the amplification and attenuation elements for the voice are arranged in the four-wire circuit. When the transformer of the link is operated as an attenuation element in the lower frequency ranges, this complex transmission or, respectively, terminating impedance is selected such that all signalization voltages are transformed into a range that can be interpreted for a 10 V technology. The signalization voltages are taken following the complex impedance. For suppressing higher-frequency noise signals, the signalization voltages are supplied via a low-pass filter to a ringing signal detector or, respectively, are supplied via selective band-pass filter to a call charge signal detector.

Due to the structure of the interface means, manufacture of the interface means is possible in low-voltage technology, that is, for example, in 10 V CMOS technology. Compared to an execution of the interface means in high-voltage technology, a comparatively small and economical module having low supply voltages results.

An advantageous development of the interface means of the present invention is a ringing signal detector wherein an output signal of a low-pass filter is supplied via a threshold switch to a flip-flop whose output indicates the presence of a ringing signal, and wherein a counter clock for a counter circuit is simultaneously enabled with the threshold switch output signal, this counter circuit initiating a resetting of the flip-flop after the absence of the signal to be recognized and a prescribed time. This ringing signal detector is distinguished by a simple structure due to the employment of simple circuit designs.

Another expedient development of the interface means of the present invention is a call charge signal detector wherein, following the band-pass filter, the call charge pulses pass through a threshold switch on an output of which they generate a pulse sequence whose frequency corresponds to that of the call charge pulse signal, whereby a flip-flop whose output indicates the presence of a call charge pulse is set and, simultaneously, a counter circuit is reset with the first signal edge of the pulse sequence. The counter circuit, after reaching the corresponding count value, initiates a resetting of the flip-flop given the absence of the pulse sequence for longer than a prescribed time. This call charge signal detector, just like the ringing signal detector, is distinguished by a simple and surveyable structure and by the employment of simple circuit designs.

A call charge signal detector wherein there is a switching possibility between two threshold switches having different thresholds is especially advantageous. It is thus possible in a simple manner to switch the sensitivity of the detector.

A call charge signal detector is also of particular advantage wherein, corresponding to the frequency of the call charge pulses, one of two existing band-pass filters is activated, whereby every band-pass filter has its own flip-flop and a corresponding count value of the counter circuit allocated to it. Reactions to different national demands in the call charge signal recognition can thus be carried out in a simple manner.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIG. 3 is a block diagram depicting the structure of a ringing signal detector of the interface means of the present invention; and FIG. 4 is a block diagram of the fundamental structure of a call charge signal detector of the interface means of the invention.

DESCRIPTION OF THE PREFERRED EMBODIMENT

Figure 1:
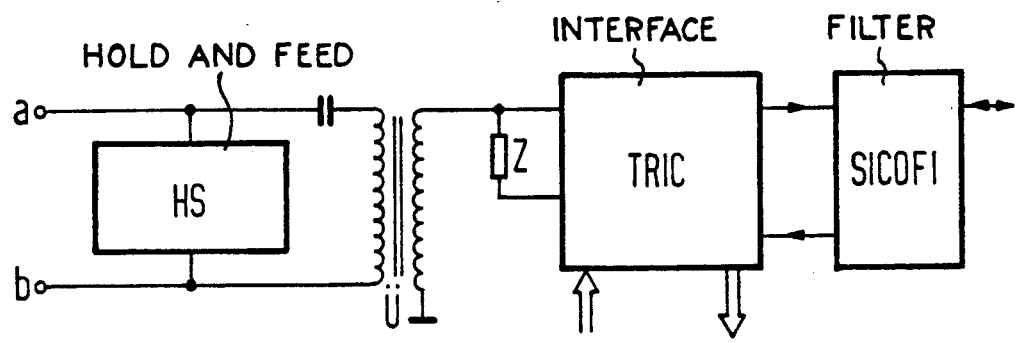
FIG. 1 is a block diagram depicting the connection of the interface means between link and signal processor-codec filter.

FIG. 1 shows the arrangement of the interface means TRIC between the signal processor-codec filter SICOFI and the exchange line having the a-leads and b-leads. A hold and feed means HS is provided at the exchange side preceding the transformer or repeater Ü. The structure of the signal processor-codec filer SICOFI shall not be discussed in greater detail herein, since it, as well as, its collaboration with a periphery assembly controller of a digital communication system are well known to one skilled in the art.

The broad arrows that lead into and away from the interface means denote signals and control lines that are not interconnected with the actual transmission path and that serve the purpose of setting the interface means. The notation Z references a transmission or, respectively, terminating impedance for the signal transmission.

Figure 2:
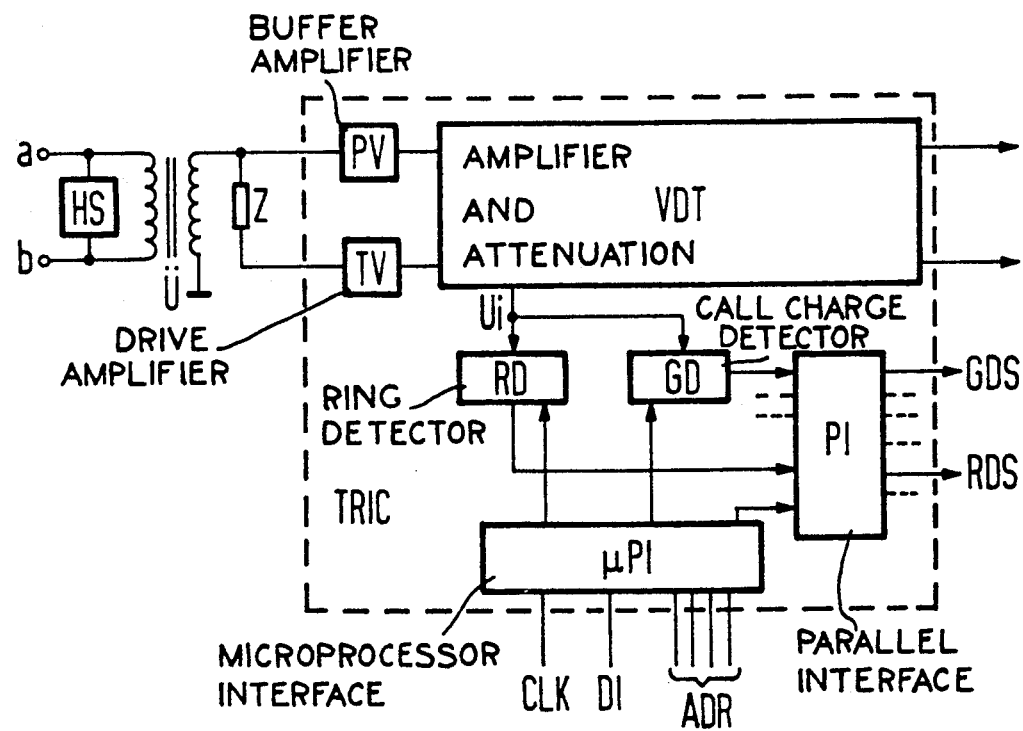
FIG. 2 is a block diagram depicting the fundamental structure of the interface means of the present invention.

FIG. 2 shows the fundamental structure of the interface means of the present invention. VDT references the amplification and attenuation part for supporting the signal processor-codec filter SICOFI. This amplification and attenuation part VDT contains a negative feedback path for promoting the two-wire-to-four-wire conversion and also contains a co-coupling path for promoting the formation of an input impedance at the two-wire side. A buffer amplifier PV is provided at the input side that, for example, is realized with an operational amplifier having a high-impedance input resistor as voltage follower. A driver amplifier TV for driving the line is located at the output side. The signalization voltage Ui that, on a case-by-case basis, can be the ringing voltage, cleardown voltage as well as the call charge pulse voltage is taken directly following the buffer amplifier of the input side.

This signalization voltage Ui is supplied both to a ringing signal detector RD and a call charge signal detector GD. These two detectors are controlled via a $\mu$P-interface $\mu$PI (a microprocessor interface) proceeding from a central means. The reference ADR therefore defines the address of the overall unit TRIC; the reference represents the data input for the microprocessor interface; and the reference CLK represents the clock input. The detected signals are supplied to the digital communication system for further processing as call charge pulse signal GDS or, respectively, as ringing signal RDS via a parallel interface PI.

FIG. 3 shows the ringing signal detector RD that is essentially composed of the low-pass filter TP, of the threshold switch US1, of the flip-flop FF1, as well as, of the counter-circuit Z1 in combination with the AND gates A1 and A2, as well as, the reset circuit ZR1.

The ringing signal detector RD must reliably recognize levels above 1 Volt±100 mVolt in the frequency range of 20 Hz$\leq$f$\leq$60 Hz. Signals whose frequency is higher than 200 Hz are therefore attenuated at least by 15 dB by the low-pass filter TP and the voice signals and call charge pulses are thus also simultaneously gated out. In addition, the input signal is freed of disturbances by the low-pass filter TP. The threshold switch output signal of the threshold switch US1 sets the flip-flop FF1 and keeps the counter means Z1 inhibited. The output RDS becomes "high" and the counter/clock is simultaneously enabled via the AND gate A2. When the signal to be recognized is absent longer than a predefined time, then the flip-flop FF1 is reset by the counter means that has then been enabled and the indication signal becomes "low". The observation time of the counter means is adjustable. The counter means serves the purpose of freeing the indication signal of noise. A reset pulse at the reset input RS erases the counter and sets the output signal RDS to "low". The threshold switch US1 cuts in for voltages Ui$>$+1 V and cuts out for voltages Ui$<$−1 V. Its output provides TTL signals.

FIG. 4 shows the call charge signal detector GD. The call charge signal detector has two band-pass filters Bp12 and Bp16 connected in parallel at its input part and also has two threshold switches US2 and US3 connected in parallel. Respectively, one of the band-pass filters, as well as, one of the threshold switches is activated via the switch-over inputs GS and GW. The band-pass filters are designed for 12 kHz or, respectively, for 16 kHz call charge pulses corresponding to the national demands. The selection of the respective band-pass filter occurs via the switch S1. One of the two threshold switches US2 or US3 can be activated with the assistance of the switch-over input for the voltage threshold. Two different voltage thresholds can be set here dependent upon whether a high or low level is present on the line, that is, the sensitivity can be set dependent on the line attenuation.

The call charge pulses generate a pulse sequence at the threshold switch US2 or US3, the frequency of this pulse sequence corresponding to the frequency of the call charge pulse signal. The corresponding flip-flop, either FF2 or FF3, is set with the first signal edge of the pulse sequence and the counter circuit Z2 is simultaneously reset with the reset means ZR2, whereas the call charge signal GDS at the output of the detector becomes "high". The counter means remains inhibited as long as the pulse sequence is present. When the pulse sequence is no longer present for a given time, then the counter respectively reaches the corresponding count value and changes state of the corresponding flip-flop, so that the call charge pulse GDS becomes "low". The counter means serves the purpose of freeing the indication signal of noise. The observation time is variable.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. Interface means having amplification and attenuation elements as well as different signalization detectors between a bidirectional transmission channel with analog signals and a signal processor-codec filter having a four-wire input for matching line signalization voltages to the interface messages of a digital communication system, the amplification and attenuation elements for a voice signal arranged in a four-wire circuit, a transformer for connecting the bidirectional transmission channel to the interface means being an attenuation element in a lower frequency range and a transmission and terminating complex impedance connected to the interface means and selected such that all signalization voltages are transformed into a range that can be interpreted by a 10 V technology system, the signalization voltages taken following the complex impedance, and, for suppressing higher-frequency noise signals, the signalization voltages supplied via a low-pass filter to a ringing signal detector or, respectively, via at least one selective band-pass filter to a call charge signal detector.

2. Ringing signal detector for an interface mans according to claim 1, wherein an output signal of the low-pass filter is supplied via a threshold switch to a flip-flop whose output indicates the presence of a ringing signal, and wherein a counter clock input to a counter circuit is simultaneously enabled with a threshold switch output signal, this counter circuit initiating a resetting of the flip-flop after the absence of the signal to be recognized following a prescribed time.

3. Call charge signal detector for an interface means according to claim 1, wherein following the band-pass filter, the call charge pulses of the call charge signal pass through at least one threshold switch at whose output they generate a pulse sequence whose frequency corresponds to that of the call charge pulse signal, at least one flip-flop whose output indicates the presence of a call charge pulse being set and, simultaneously, a counter circuit being reset with a first signal edge of the pulse sequence, and wherein after the absence of the pulse sequence for longer than a prescribed time, the counter circuit initiates a resetting of the flip-flop after reaching the corresponding count value.

4. Call charge signal detector according to claim 3, wherein a signal is provided for switching between two threshold switches having different thresholds.

5. Call charge signal detector according to claim 3, wherein corresponding to the frequency of the call charge pulses, one of two band-pass filters is activated, whereby each band-pass filter has its own associated flip-flop and a corresponding count value of the counter circuit allocated to it.

6. Interface means having amplification and attenuation elements as well as different signalization detectors between a bidirectional transmission channel with analog signals and a signal processor-codec filter having a four-wire input for matching line signalization voltages to the interface messages of a digital communication system, the amplification and attenuation elements for a voice signal arranged in a four-wire circuit, a transformer for connecting the bidirectional transmission channel to the interface means being operated as an attenuation element in a lower frequency range and a complex impedance, connected between the transformer and the interface maris, selected such that all signalization voltages are transformed into a range that can be interpreted by a 10 V technology system, the signalization voltages taken following the complex impedance, and, for suppressing higher-frequency noise signals, the signalization voltages supplied via a low-pass filter to a ringing signal detector or, respectively, via at least one selective band-pass filter to a call charge signal detector; an output signal of the low-pass filter supplied via a ringing signal threshold switch to a first flip-flop whose output indicates the presence of a ringing signal, and a first counter clock input to a first counter circuit simultaneously enabled with a ringing signal threshold switch output signal, this first counter circuit initiating a resetting of the first flip-flop after the absence of the signal to be recognized following a prescribed time; following the band-pass filter, call charge pulses of the call charge signal pass through at least one call charge threshold switch at whose output they generate a pulse sequence whose frequency corresponds to that of the call charge signal, at least one call charge flip-flop whose output indicates the presence of a call charge pulse being set and, simultaneously, a second counter circuit being reset with the first signal edge of the pulse sequence, and wherein after the absence of the pulse sequence for longer than a prescribed tie, the second counter circuit initiates a resetting of the call charge flip-flop after reaching the corresponding count value.

7. Call charge signal detector according to claim 6, wherein a signal is provided for switching between two call charge threshold switches having different thresholds.

8. Call charge signal detector according to claim 6, wherein corresponding to the frequency of the call charge pulses, one of two band-pass filters is activated, whereby each band-pass filter has its own associated call charge flip-flop and a corresponding count value of the second counter circuit allocated to it.

9. An interface for interconnecting a bidirectional transmission channel having analog signals and a signal processor-codec filter having a four-wire port, comprising:

means for amplification and attenuation having a first port connected to said four-wire port and having a second port;

transformer means for connecting said bidirectional transmission channel to said second port and a means for providing a terminating impedance across said second port, said means for providing a terminating impedance being connected between said transformer means and said second port, said transformer means also being an attenuation element in a low frequency range and said means for providing a terminating impedance transforming predetermined analog signals into signalization voltages in a predetermined voltage range, the signalization voltages being present following the means for providing a terminating impedance; and at least one means for detecting the signalization voltages.

10. Interface according to claim 9, wherein said means for detecting has means for low-pass filtering having an input connected to said means for amplifying and attenuating, and has a ringing signal detector having an input connected to an output of said means for low-pass filtering.

11. Interface according to claim 10, wherein said ringing signal detector comprises, a flip-flop having a first input connected to said output of said low-pass filter via a threshold switch and a second input operatively connected to an output of a counter, a reset input of the counter operatively connected to an output of the threshold switch and a first input of the counter connected to the output of the flip-flop and to a counter clock via an AND gate, the output of the flip-flop providing a signal indicating the presence of a signalization voltage which is a ringing signal.

12. Interface according to claim 9, wherein said means for detecting has means for selective band-pass filtering having an input connected to said means for amplifying and attenuating, and has a call charge signal detector having an input connected to an output of said means for selective band-pass filtering.

13. Interface according to claim 12, wherein said call charge signal detector comprises at least one threshold switch for connecting a first input of at least one flip-flop to said output of said threshold switch, said output of said threshold switch also connected to a reset input of a counter, an output of said counter being operatively connected to a second input of said flip-flop, a first input of said counter operatively connected to a counter clock and an output of said flip-flop providing a signal indicating the presence of a signalization voltage which is a call charge signal.

14. Interface according to claim 13, wherein said means for band-pass filtering: has first and second band-pass filters having their inputs connected via a first means for switching to said means for amplifying and attenuating and having their outputs connected together to a second means for switching; has first and second threshold switches having their inputs connected to said second means for switching and their outputs connected together to a third means for switching; has first and second flip-flops having their first inputs connected to said third means for switching, having second inputs operatively connected to said output of said counter and having their outputs operatively connected together; said reset input of said counter operatively connected to said outputs of said threshold switches; and said first, second and third means for switching operable to select said first band-pass filter, said first threshold switch and said first flip-flop, or to select said second band-pass filter, said second threshold switch and said second flip-flop.

* * * * *